United States Patent Office 3,250,805
Patented May 10, 1966

3,250,805
MANUFACTURE OF ADAMANTANE
CARBOXYLIC ACIDS
Angelo A. Lamola, Newark, N.J., assignor to E. I. du
Pont de Nemours and Company, Wilmington, Del., a
corporation of Delaware
No Drawing. Filed Apr. 19, 1962, Ser. No. 188,872
3 Claims. (Cl. 260—514)

The present invention relates to a process for the manufacture of adamantane carboxylic acids, specifically 1-adamantanecarboxylic acid and 1,3-adamantanedicarboxylic acid.

1-adamantanecarboxylic acid and 1,3-adamantanedicarboxylic acid are prepared in accordance with the present invention by heating a mixture of adamantane and sulfuric acid in the presence of carbon monoxide.

It will be found most convenient to carry out the process of the invention under a pressure of carbon monoxide. The pressure can be varied widely as desired, but other conditions being equal, the reaction rate increases with increasing pressure. As a practical matter, in order to maintain a reasonable reaction rate a pressure of at least 3 atmospheres is employed. The upper pressure limit is not critical from a process standpoint, the economics as determined primarily by the cost of extremely high pressure equipment being the limiting factor. Maintaining a carbon monoxide pressure in the range of from about 6 atmospheres to about 150 atmospheres gives good results and is preferred.

The sulfuric acid employed in the practice of the process of the invention has a concentration of at least 90% $H_2SO_4$ and preferably 90% to 103% $H_2SO_4$, strength above 100% indicating, as is conventional, that free $SO_3$ is present.

The ratio of sulfuric acid to adamantane employed in the practice of the process of the invention can be varied widely. Unless some added diluent liquid is employed, it is desirable to use at least 3 parts by weight of sulfuric acid for each part by weight of adamantane in order to obtain a reaction mass that is not unduly thick and can be agitated by conventional means. While there is no upper limit on the amount of sulfuric acid that can be used, it becomes economically unattractive to use more than about 20 parts of sulfuric acid for each part of adamantane because larger amounts do not provide advantages commensurate with the increased cost of the acid. Preferably, from about 10 to 20 parts by weight of sulfuric acid are used per part by weight of adamantane.

In general, the process of the invention is carried out at a temperature between about 25° C. and 175° C. At temperatures below about 25° C., the reaction is unduly slow; and above 175° C., the adamantane reactant begins to char. Temperatures at the lower end of the range favor the formation of 1-adamantanecarboxylic acid and the temperatures at the upper end favor formation of 1,3-adamantanedicarboxylic acid. For example, at a carbon monoxide pressure of about 20 atmospheres and 95% sulfuric acid, a product consisting predominantly of the dicarboxylic acid is obtained at 150° C. in one hour and at 100° C. in about three hours. In contrast, at a temperature of 25° C. in 103% sulfuric acid at the same carbon monoxide pressure an 85% conversion to 1-adamantanecarboxylic acid is obtained in 2 hours. In general, it is preferred to operate in the temperature range of 90° to 160° C.

The adamantane carboxylic acid products of the process can be isolated from the reaction mixture by conventional means. For example, the mixture can be poured on to ice or into ice water which precipitates a crystalline solid mixture of the acids. This acid mixture can be esterified with methanol, for example, to give methyl esters of the mono- and dicarboxylic acids which can then be separated by distillation. If the free acid is desired, the mixed acid product can be recrystallized from a suitable solvent such as glacial acetic acid.

The adamantane carboxylic acids obtained by the process of this invention have higher thermal and chemical stability than similarly substituted derivatives of other ring systems. The adamantane carboxylic acids can be substituted for other acids conventionally employed in making polymers with the consequent improvement in properties of the resulting polymers. The adamantane carboxylic acids are particularly useful, for example, in the preparation of linear polymers capable of being spun into fibers or cast into films. Such fibers and films exhibit resistance to heat superior to that of fibers and films made from acids conventionally employed.

The invention is further illustrated by reference to the following examples in addition to the examples given above. Parts are by weight.

*Example 1*

A glass-lined pressure reactor is charged with 27 parts of adamantane and 184 parts of concentrated (85%) sulfuric acid. The vessel is then pressurized to 300 p.s.i.g. with carbon monoxide, agitated and heated at 150° C. for 1 hour. The vessel is then cooled, vented and the product poured on to 100 parts of crushed ice. The solids which separate are filtered off and dried (yield—34 parts). A small portion of the crude product is esterified by mixing it with an excess of diazomethane in ether solution. The solid resulting from evaporation of the ether is passed through a two-foot-long hydrocarbon-on-diatomaceous earth chromatographic column in the vapor phase at 250° C. and is separated into three components; adamantane, methyl 1-adamantanecarboxylic and dimethyl-1,3-adamantanedicarboxylate in a weight ratio of 3:13:84. These components are identified by comparison with authentic samples and by nuclear magnetic resonance spectra which show that the carboxyl groups are on the tertiary carbon atoms.

The remaining portion of the crude product is agitated in 5% aqueous NaOH to dissolve the acids and the undissolved, unreacted adamantane is filtered off. The filtrate solution is treated with decoloring charcoal, acidified with 20% aqueous HCl and the white solid filtered off. After drying at 100° C. for 1 hour the mixture of 1-adamantanecarboxylic acid and 1,3-adamantanedicarboxylic acid has a melting point of 255–268° C.

This mixture is esterified with methanol by refluxing it in 200 parts of methanol containing 1 part of concentrated sulfuric acid. Vapor phase chromatographic analysis of these methyl esters shows the same ratio of mono- to di-acid found by esterification with diazomethane. The diester, separated from the mono acid by the chromatograph gave an infrared spectrum having characteristic peaks at 7.15μ, 7.3μ, 7.51μ (doublet), 7.85μ, 8.15μ and 14.6μ, identical to the spectrum of authentic dimethyl 1,3-adamantanedicarboxylate.

The mixture of acids is also esterified in a pressure vessel with methanol containing 1% sulfuric acid at 200° C. with similar results.

*Example 2*

The procedure of Example 1 is repeated except that the temperature is held at 100° C. for 3 hours and the pressure is 100 p.s.i.g. The product is isolated and identified as described in Example 1 as a mixture of 58% adamantane, 16% 1-adamantanecarboxylic acid and 25% 1,3-adamantanedicarboxylic acid.

Example 3

Adamantane (40.5 parts) is mixed with concentrated (95%) sulfuric acid (540 parts) and placed in a stirred pressure reactor constructed of stainless steel. The reactor is pressurized to 600 p.s.i.g. with CO, heated to 95° C. and stirred for 5 hours. The reactor is then cooled, the product removed and recovered as described in Example 1. The product contains 85% 1,3-adamantanedicarboxylic acid and 15% 1-adamantanecarboxylic acid.

The above preparation is repeated using CO at 2000 p.s.i.g. pressure with similar results.

While the invention has been described in detailed examples with particular reference to specific embodiments, it will be appreciated that no unnecessary limitations are to be understood therefrom. The invention is not limited to the exact details shown and described for obvious modifications will occur to those skilled in the art. The embodiments of the invention in which an exclusive property or privilege is claimed are defined as follows:

1. A process for the manufacture of adamantanecarboxylic acids which consists essentially of heating a mixture of adamantane with at least three parts by weight of at least 90% sulfuric acid at about 25° to 175° C. in the presence of carbon monoxide at a pressure of at least three atmospheres and pouring the resulting mixture into water to produce a solid crystalline mixture of adamantanecarboxylic acids.

2. The process of claim 1 wherein the temperature is from about 90° C. to about 160° C.

3. A process for the manufacture of adamantanecarboxylic acids which consists essentially of heating a mixture of adamantane with about 10 to 20 parts by weight of 90–103% sulfuric acid at about 90–160° C. in the presence of carbon monoxide at a pressure from about 3 atmospheres to about 150 atmospheres and pouring the resulting mixture into water to produce a solid crystalline mixture of 1-adamantanecarboxylic acid and 1,3-adamantanedicarboxylic acid.

References Cited by the Examiner
UNITED STATES PATENTS
2,687,432   8/1954   Coffman _____ 260—514

OTHER REFERENCES

Haaf et al., "Liebig's Annalen der Chemie," vol. 638, pp. 122–135 (1960).

Koch et al., "Liebig's Annalen der Chemie," vol. 618, pp. 251–266 (1958).

Koch et al., "Angew Chem.," vol. 72, page 628 (1960).

Stetter et al., Ber. Deut. Chem., vol. 52, pages 1629–35 (1959).

LORRAINE A. WEINBERGER, *Primary Examiner.*

DUVAL McCUTCHEN, *Examiner.*